United States Patent
Vegors

[15] 3,692,331
[45] Sept. 19, 1972

[54] LOAD TRANSFER COUPLING MECHANISM

[72] Inventor: Lester S. Vegors, 300 E. Second St., Webster City, Iowa 50595

[22] Filed: May 13, 1971

[21] Appl. No.: 142,915

[52] U.S. Cl. ............... 280/405 R, 280/489, 280/492, 280/490, 214/86 A
[51] Int. Cl. ............................................. B62d 53/00
[58] Field of Search ..................... 280/405, 489, 492

[56] References Cited

UNITED STATES PATENTS

| | | | |
|---|---|---|---|
| 1,908,711 | 5/1933 | Kuchar | 280/489 X |
| 2,463,140 | 3/1949 | Bihn | 280/489 X |
| 2,486,605 | 11/1949 | Ladd | 280/489 |
| 3,368,828 | 2/1968 | Engler | 280/489 |
| 3,377,086 | 4/1968 | Ditchfield | 280/489 |

Primary Examiner—Leo Friaglia
Attorney—Rudolph L. Lowell

[57] ABSTRACT

The coupling mechanism includes a mounting bracket supported on the trailer tongue for pivotal movement along a transverse axis; and a coupling member having a rear and section supported on the bracket for pivotal movement about a longitudinal axis; and a front end section connected to the tractor vehicle for pivotal movement about a vertical axis. A spring loaded linearly adjustable unit pivotally interconnected between the bracket and tongue structure is selectively adjustable to pivotally move the bracket in either direction about the transverse axis therefor concurrently with providing for the application or removal of a load from the tongue structure to vary the distribution of the trailer and tractor loads.

6 Claims, 7 Drawing Figures

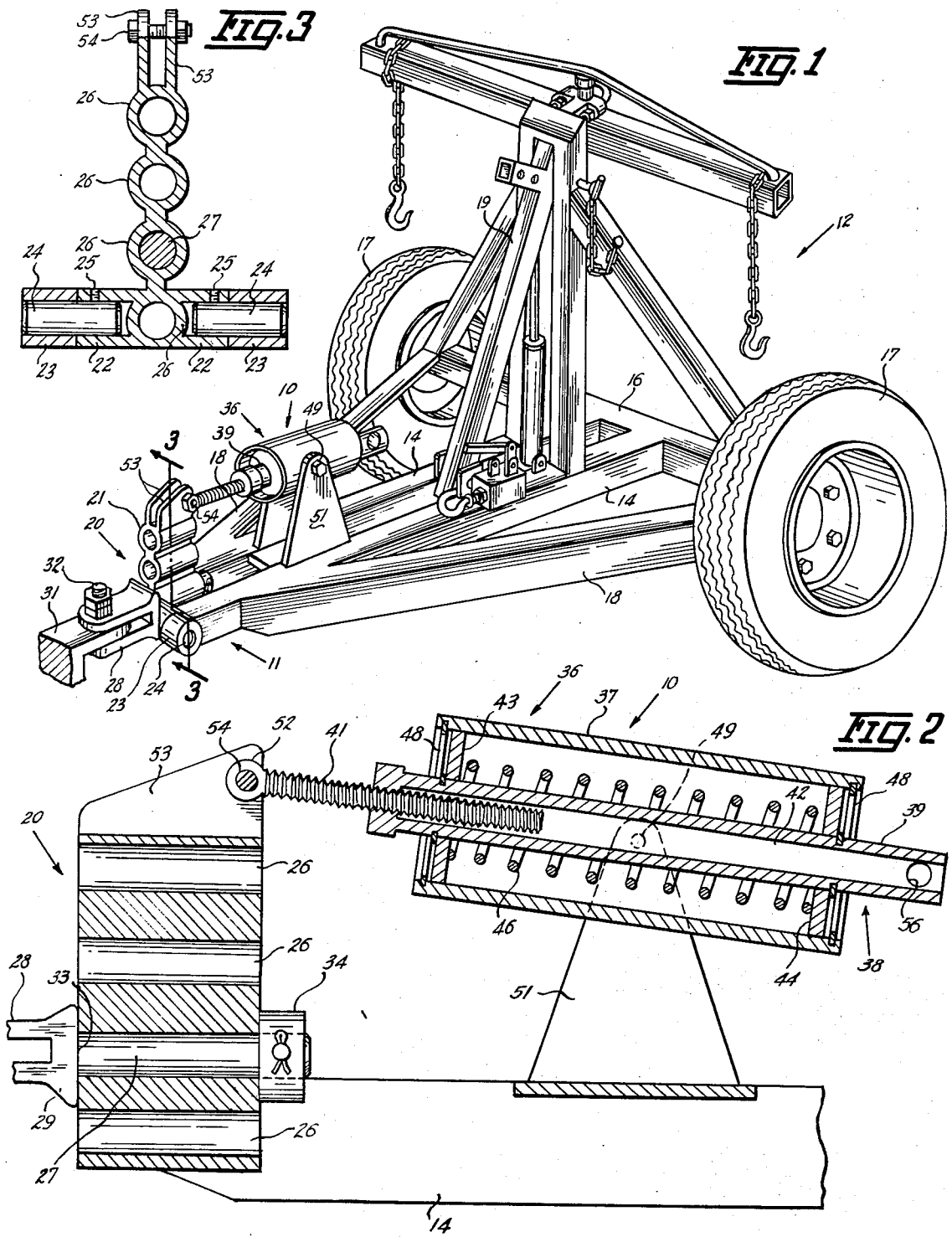

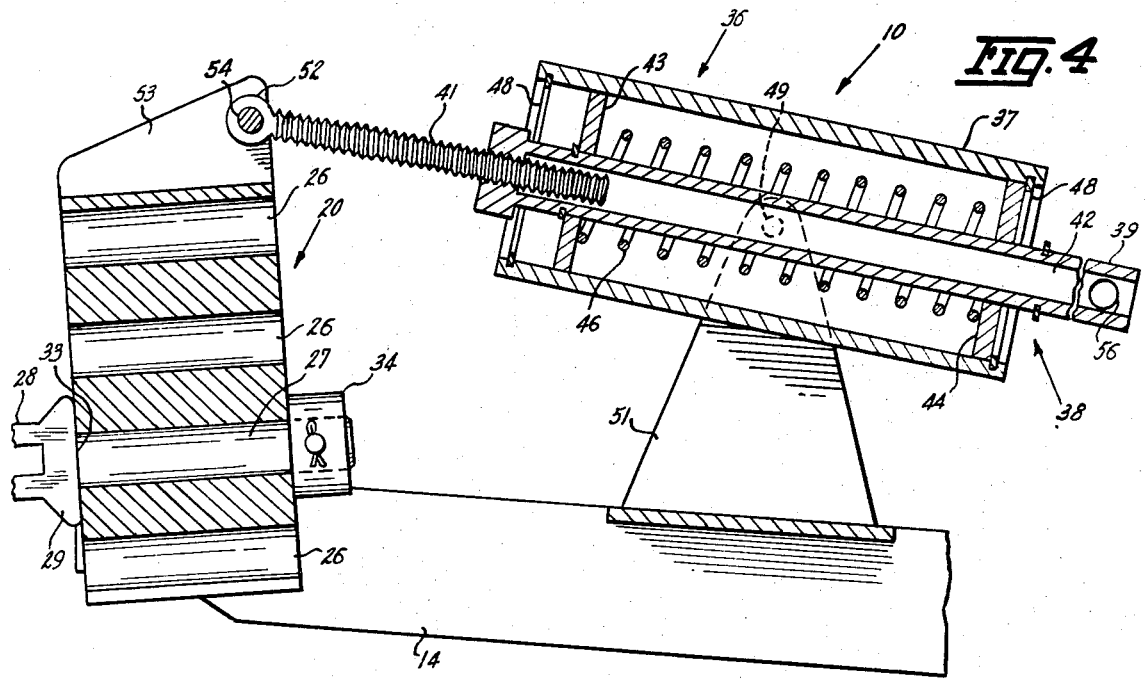
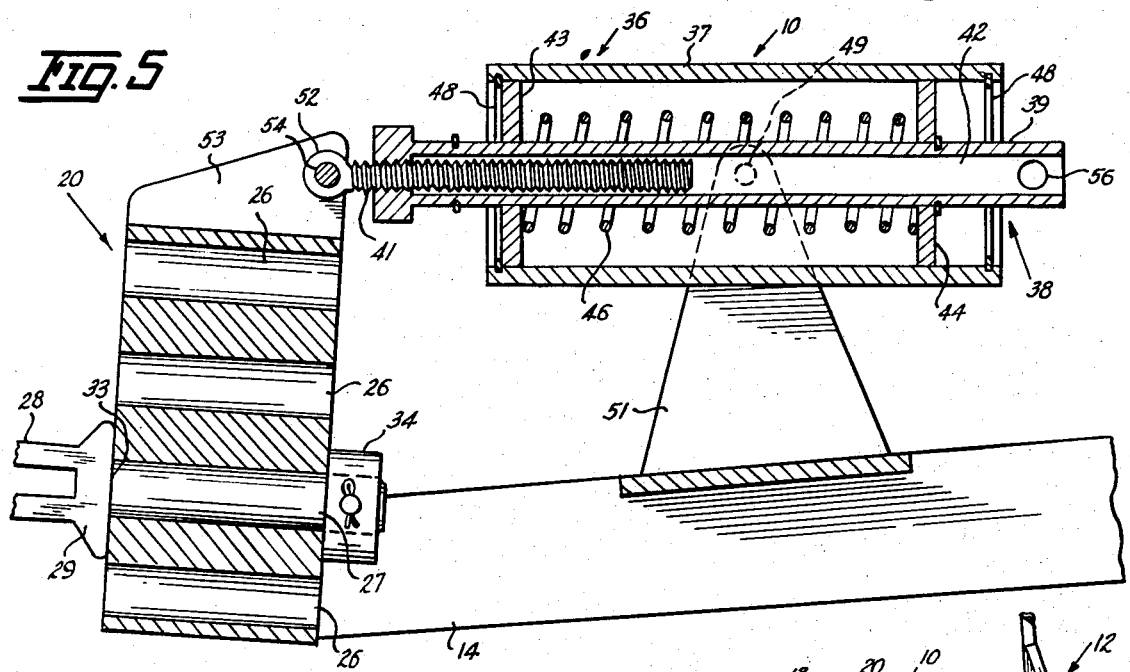
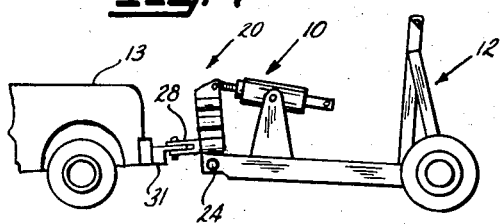
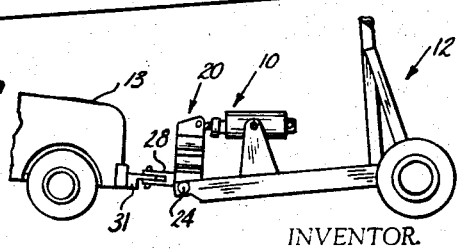
INVENTOR.
LESTER S. VEGORS
BY
ATTORNEY.

LOAD TRANSFER COUPLING MECHANISM

SUMMARY OF THE INVENTION

The coupling mechanism is of a simple and compact construction and is readily adjusted to efficiently and selectively shift weight or an imposed load between a car and a trailer therefor. Under adverse road or weather conditions, requiring additional tractive effort by the car, traction can be increased by transferring load from the trailer to the rear end of the car. The transfer mechanism is under a minimum preloaded condition so that when the trailer is empty bouncing and swaying thereof, even at high speed is eliminated.

BRIEF DESCRIPTION OF THE DRAWINGS

FIG. 1 is a front perspective view of a trailer for handling disabled vehicles showing the load transfer coupling mechanism of this invention in assembly therewith;

FIG. 2 is an enlarged longitudinal sectional view taken along the line 2—2 in FIG. 1 showing the transfer mechanism in a neutral position therefor;

FIG. 3 is an enlarged detail sectional view as seen on the line 3—3 in FIG. 1;

FIG. 4 is a sectional view illustrated similarly to FIG. 2 with parts of the transfer mechanism in relative positions providing for the transfer of the load or weight from the tractor vehicle to the trailer;

FIG. 5 is illustrated similarly to FIG. 2 and shows the parts in relative positions providing for the transfer of load from the trailer to the rear end of the vehicle;

FIG. 6 is a diagrammatic view illustrating the relative positions of the car and trailer when the transfer mechanism is in the loaded condition shown in FIG. 5; and FIG. 7 is a diagrammatic view illustrating the relative positions of the car and the trailer when the transfer mechanism is under the loaded condition shown in FIG. 4.

DETAIL DESCRIPTION OF THE INVENTION

Referring to FIGS. 6 and 7 of the drawing, the load transfer coupling mechanism of this invention, indicated generally as 10, is shown mounted on the tongue structure 11 of a trailer 12 and connected with a tractor vehicle such as a car 13. Trailer 12 (FIG. 1) is of a type adapted to pick up the front end of a disabled vehicle (not shown) to provide for such vehicle being towed by a passenger car to a service or a repair station.

The trailer 12 includes the tongue structure 11 which constitutes the frame of the trailer. The tongue structure 11 has a pair of transversely spaced longitudinal center members 14 with rear ends secured to a transverse beam member 16 equipped at the opposite ends thereof with rotatable ground wheels 17. Brace members 18 are interconnected between the rear member 16 and the center members 14 and a pivoted mast 19 for carrying a disabled vehicle is mounted on the center members 14 forwardly of the rear beam 16. For a more detailed description of the trailer 12 reference is made to Vegors U.S. Pat. No. 3,522,892.

The transfer mechanism 10 includes a mounting bracket 20 (FIGS. 1 and 3) located at the front end of the center members 14 and having a body member 21 projected upwardly from and extended longitudinally of the space between the center members 14. The upwardly projected body member 21 is formed of a series of vertically spaced sleeve or bearing members 26, illustrated as four in number, for selectively and rotatably receiving the rear end section 27 of a coupling member 28. Secured to and projected transversely in opposite directions from the bottom sleeve member 26 are bearing units 22 which are positioned between a pair of tubular sections 23 corresponding to and secured to the front end faces of the center members 14. A pivot pin 24 extended axially through each tubular section 23 and adjacent bearing unit 22 is held against rotational and axial movements relative to a tubular section 23 by a locking screw 25. The bracket 20 is thus supported for pivotal movement between the center members 14 about an axis extended transversely of the tongue structure.

As shown in FIG. 2 the front end section 29 of the coupling member 28 is of a bifurcated or clevis construction for receiving a rearwardly extended draw bar 31 on the car 13. A hitch bolt 32 projected through the draw bar 31 and the front end section 29 pivotally connects the coupling member 28 to the draw bar 31 for pivotal movement about a vertical axis A shoulder 33 (FIG. 2), defining the junction of the sections 27 and 29 of the coupling member 28, is engageable with the front face of the body member 21 so as to limit movement of the coupling member 28 in a rearward direction. A stop collar 34 on the rear end section 27 is engageable with the rear face of the body member 21 to hold the coupling member against forward movement. On removal of the stop collar 34 the coupling member 28 is selectively movable into operative association with any one of the bearing members 26 to accommodate cylinder 37. To maintain the piston members against movement out of the cylinder 37 each end of the cylinder is provided with a retaining ring 48 for engaging the outer peripheral portion of an adjacent corresponding piston member 43 and 44. It is seen, therefore, that the piston rod retaining rings 47 maintain the piston members in continuous operative engagement with the coil spring 46 and that the cylinder retaining rings 48 maintain the piston members 43 and 44 against movement out of operative engagement with the inner peripheral surface of the cylinder 37.

The cylinder 37, at transversely opposite side portions thereof, is pivotally supported for up and down tilting movement on a pair of axially aligned pivot members 49 carried at the upper ends of a pair of transversely spaced upright supports 51, the lower ends of which are secured to corresponding ones of the center members 14. The forward end of the screw or front rod section 41 of the piston rod assembly 38 is formed with an eye 52 which is received between a pair of transversely spaced ears 53 projected upwardly from the top one of the bearing members 26 of the body member 21. A bolt assembly 54 projected through the ears 53 and the eye 52 pivotally connects the bracket 20 and the adjustable unit 36 for relative pivotal movement about a transverse axis. It will be additionally noted that the bolt assembly 54 holds the screw member 41 against rotation relative elevation variations between the draw bar 31 and the tongue structure 11.

Located rearwardly of the bracket member 20 and extended longitudinally above the center members 14 is a retractible and extendible adjustable unit 36 which includes a cylinder 37 and an associated piston assembly 38. The piston assembly 38 includes a linearly adjustable piston rod comprised of a rear rod section 39 projected axially through the cylinder 37 and a forward reduced rod section 41 comprised of a screw threadably engageable within an axial bore 42 formed in and open to the front end of the rear piston rod section 39. Mounted about the rear piston rod section 39 for slidable movement axially thereof are front and rear piston members 43 and 44, respectively, which are in operative association with the inner peripheral surface of the cylinder 37. Arranged in compression between the piston members 43 and 44 and positioned about the rear piston rod section 39 is a coil spring 46. A retaining ring 47 corresponding to each piston member is mounted about the piston rod section 39 to limit relative movement of the piston members 43 and 44 away from each other in response to the action of the spring 46.

As clearly shown in FIG. 2, when a piston member 43 and 44 is in engagement with an adjacent retaining ring 47, the piston members are located within the axial confines of the cylinder 37. To maintain the piston members against movement out of the cylinder 37 each end of the cylinder is provided with a retaining ring 48 for engaging the outer peripheral portion of an adjacent corresponding piston member 43 and 44. It is seen, therefore, that the piston rod retaining rings 47 maintain the piston members in continuous operative engagement with the coil spring 46 and that the cylinder retaining rings 48 maintain the piston members 43 and 44 against movement out of operative engagement with the inner peripheral surface of the cylinder 37.

The cylinder 37, at transversely opposite side portions thereof, is pivotally supported for up and down tilting movement on a pair of axially aligned pivot members 49 carried at the upper ends of a pair of transversely spaced upright supports 51, the lower ends of which are secured to corresponding ones of the center members 14. The forward end of the screw or front rod section 41 of the piston rod assembly 38 is formed with an eye 52 which is received between a pair of transversely spaced ears 53 projected upwardly from the top one of the bearing members 26 of the body member 21. A bolt assembly 54 projected through the ears 53 and the eye 52 pivotally connects the bracket 20 and the adjustable unit 36 for relative pivotal movement about a transverse axis. It will be additionally noted that the bolt assembly 54 holds the screw member 41 against rotation relative to the rear piston rod section 39. Thus, by inserting a rod member (not shown) through a transversely extended hole 56 in the rear end of the rod section 39, such section 39 is rotated relative to the screw 41 to linearly extend or contract the piston rod assembly 38.

With reference to FIG. 2, the adjustable unit 36 is illustrated in what will be referred to as its neutral position wherein there is no load transfer between the car 13 and trailer 12 and the coupling member 28 and draw bar 31 are substantially horizontal. In obtaining this neutral position, the rear section 27 of the coupling member 28 is initially positioned in a selected one of the sleeve bearings 26 to accommodate elevation variations between the trailer tongue 11 and the draw bar 31.

The coil spring 46 is of a length, relative to the spacing between the piston members 43 and 44, as defined by their engagement with respective ones of the rod retainer rings 47, to provide an initial compression pressure of about six hundred pounds. Stated otherwise, in the neutral position of the adjustable unit 36, the spring 46 is in a pre-loaded condition. As a result, in the travel of the car-trailer combination over a road surface relative pivotal movement of the car 13 and trailer 12 about the transverse axis 24 is subject to the dampening action of the coil 46 as effected by the engagement of a piston member 43 or 44 with a corresponding cylinder retaining ring 48. This dampening action appreciably reduces any tendency of the trailer to bounce or sway relative to the car as would occur if the trailer were free to pivot about the axis 24.

To transfer weight from the car 13 onto the trailer 12 the piston rod assembly 38 is extended from its position shown in FIG. 2 to its position shown in FIG. 4 by rotating the rod section 39 relative to the screw 41 so that the rod section 39 is moved rearwardly relative to the cylinder 37 concurrently with an extension of the screw 41 forwardly from the cylinder. This extension of the piston rod assembly 38 provides for a compressing of the coil spring 46 against the rear piston member 44 which, as shown in FIG. 4, is held against rearward movement by engagement with its corresponding cylinder retaining ring 48. Thus on a rearward movement of the piston rod section 39, the spring 46 is compressed by the front piston member 43 which is movable rearwardly with the rod section 39 by virtue of engagement with its corresponding rod retaining ring 47.

This adjustment of the adjustable unit 36 provides for an elevation of the rear end of the car 13 concurrently with a downwardly and rearwardly pivoting of the trailer tongue 11 relative to the transverse axis 24. In the elevated position of the car rear portion, and as shown in FIG. 7, the coupling member 28 and draw bar 31 are slightly tilted from the horizontal in an upward and rearward direction. The weight of the car 12, therefore, acts at the pivot 24 to move the coupling member 28 to a position extended longitudinally of the tongue 11. This movement of the coupling member, however, is resisted by the coil spring 46 acting through the piston rod assembly 38 to urge the bracket 20 in a rearward direction relative to the transverse axis 24. As a result, weight at the rear end of the car 12 is transmitted against the counteracting force of the spring 46 for application downwardly through the supporting members 51 to the tongue structure 11. Such weight is thus effectively transferred to the trailer 11 without impairing the dampening function of the adjustable unit 36 relative to the pivot connection 24.

To transfer weight from the trailer 12 to the rear end of the car 13, the rear rod section 39 is rotated in a direction to retract the screw 41 within the bore 42 to their relative positions shown in FIG. 5. The resultant forward movement of the rear rod section 39 relative to the cylinder 37 provides for the front piston member 43 being moved into engagement with its corresponding cylinder retainer ring 48 and the rear piston member 44 being moved toward the front piston member by its associated rod retaining ring 47. The spring 46, therefore, is compressed by the rear piston member 44 against the front piston member 43.

During this contracting movement of the piston rod assembly 38, the coupling member 28 and draw bar 31 are moved downwardly concurrently with a movement of the trailer tongue 11 to a position inclined downwardly and forwardly relative to the pivot 24 (FIG. 6). The spring 46 thus tends to pivot the mounting bracket 20 in a forward direction relative to the axis 24 so as to effectively transfer weight or load from the trailer 12 onto the car 13 at the draw bar 31. It will be noted again that this transfer of load from the trailer to the car takes place while retaining the dampening effect of the adjustable unit 36 against a free pivotal movement of the trailer tongue 11 about the transverse axis 24.

It will be readily appreciated that relative weight transfer between the car and the trailer is simply accomplished by manipulation of the piston rod assembly 38 to extend or retract the screw member 41 relative to the rod section 39. As a result this weight transfer can be utilized to vary the tractive effort of the car when necessary to overcome adverse weather or road conditions. When the driving hazard has been overcome, the unit 36 can again be simply manipulated to distribute the weight for normal road travel.

Although the invention has been described with respect to a preferred embodiment thereof, it is to be understood that it is not to be so limited since changes and modifications can be made therein which are within the full intended scope of this invention as defined by the appended claims.

I claim:

1. A load transfer coupling mechanism for a tractor having a draw bar and a trailer having a tongue structure connectible with the draw bar comprising:
   a. a mounting bracket pivoted on the forward end of said tongue structure for pivotal movement about an axis extended transversely of the tongue structure,
   b. a coupling member having a rear portion rotatably supported on said mounting bracket for rotation about an axis extended longitudinally of said tongue structure, and a front portion,
   c. means pivotally connecting said front portion to said draw bar for pivotal movement about a vertical axis,
   d. a yieldable adjustable means located rearwardly of said mounting bracket including a linearly retractible and extendible unit having one end movably connected to said mounting bracket,
   e. means for yieldably urging said mounting bracket in one or the other direction of pivotal movement therefor relative to the transverse axis therefor, in response to the retraction or extension of said unit, and
   f. means pivotally supporting said adjustable means on said tongue structure for tilting movement longitudinally of said tongue structure.

2. A load transfer coupling mechanism for a tractor having a draw bar and a trailer having a tongue structure connectible with the draw bar comprising:
   a. a body member pivoted on the forward end of said tongue structure for pivotal movement about an axis extended transversely of the tongue structure, said body member including an upright projection,
   b. a coupling member having a rear portion rotatably mounted on said body member for rotation about an axis extended longitudinally of said tongue structure, and a front portion located forwardly of said body member,
   c. means pivotally connecting said front portion to the draw bar for pivotal movement about a vertical axis,
   d. a linearly adjustable spring assembly extended longitudinally of the tongue structure and located rearwardly of said body member,
   e. means pivotally supporting said spring assembly on the tongue structure for tilting movement about an axis extended transversely of the tongue structure, and
   f. other means pivotally connecting the forward end of said spring assembly to said upright projection for pivotal movement about an axis extended transversely of the tongue structure.

3. The load transfer coupling mechanism according to claim 2 wherein:
   a. said upright projection includes a series of vertically spaced bearing members for selectively and rotatably receiving the rear portion of said coupling member, and
   b. said forward end of the adjustable means is positioned above the uppermost one of said bearing members.

4. The load transfer coupling mechanism according to claim 2 wherein:
   a. said spring assembly includes a linearly extendible and retractible unit and said other pivot means connects one end of said extendible and retractible unit to said upright projection,
   b. a cylindrical sleeve member through which said unit is axially extended,
   c. a pair of piston members movably mounted on said unit having outer peripheral portions in bearing engagement with the inner peripheral surface of said cylindrical member,
   d. means on said unit limiting the movement of said piston members away from each other,
   e. a spring member positioned about said unit and arranged in compression between said piston members, and
   f. a pair of stop means corresponding to said piston members mounted at opposite ends of said cylindrical member, each stop means engageable with a corresponding piston member to retain a piston member against movement out of the cylindrical member.

5. The load transfer coupling mechanism according to claim 4 wherein:
   a. one of said piston members, in response to an adjustment of said linearly extendible and retractible unit, is moved to a position in engagement with a corresponding stop means and the other of said piston members is moved inwardly of said cylinder and toward said one piston member whereby to compress said spring member therebetween.

6. A load transfer coupling mechanism for a tractor having a draw bar and a trailer having a tongue structure connectible with the draw bar comprising:
   a. a body member pivoted on the forward end of said tongue structure for pivotal movement about an axis extended transversely of the tongue structure,
   b. coupling means interconnecting said body member and draw bar for pivotal movement of said tongue structure about longitudinal and vertical axes relative to said draw bar,
   c. a yieldable adjustable means located rearwardly of said body member including a linearly retractible and extendible unit having one end movably connected to said body member,
   d. means for yieldably urging said body member in one or the other direction of pivotal movement therefor relative to the transverse axis therefor, in response to the retraction or extension of said unit, and
   e. means supporting said adjustable means on said tongue structure.

* * * * *